P. J. BERNARD.
PORTABLE WIND SHIELD.
APPLICATION FILED MAY 28, 1912.
1,064,430.
Patented June 10, 1913.
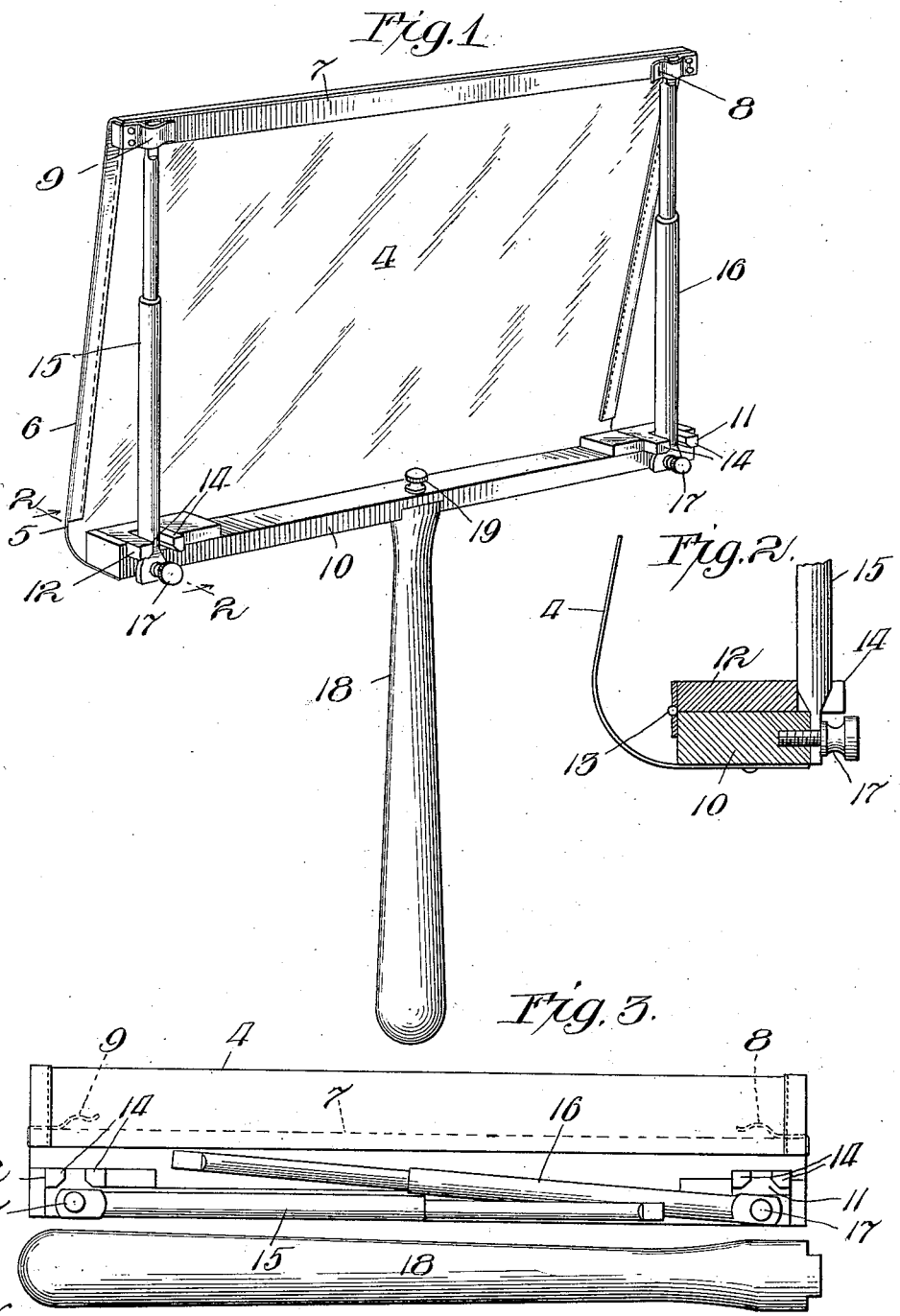

UNITED STATES PATENT OFFICE.

PETER J. BERNARD, OF CHICAGO, ILLINOIS.

PORTABLE WIND-SHIELD.

1,064,430.   Specification of Letters Patent.   Patented June 10, 1913.

Application filed May 28, 1912. Serial No. 700,171.

*To all whom it may concern:*

Be it known that I, PETER J. BERNARD, a citizen of the United States, residing at Chicago, in the county of Cook and State of Illinois, have invented certain new and useful Improvements in Portable Wind-Shields, of which the following is a specification.

This invention relates to an improvement in portable wind shields adapted more especially for use when traveling in vehicles, such as automobiles, and motor boats, where it is desirable for protection against wind, water, and weather conditions generally.

It is the essential object to construct an efficient, economical, and durable device capable of being carried when not used in compact knock-down form, and yet permitting its foldable frame to be readily extended and locked in operative position; and the invention further consists in the features of construction and combination of parts hereinafter described and claimed.

In the drawing, Figure 1 discloses a preferred form of device in perspective; Fig. 2 a sectional detail taken on line 2—2 of Fig. 1; and Fig. 3 an elevation showing the device collapsed.

Referring to Fig. 1, a flexible transparent protector body 4 is shown, and may be made of any transparent flexible material, such as celluloid, and of any desirable formation, and may have its outer side edges 5 lined with a protecting frame edge strip of fabric 6 for protecting the edges against breakage, injury and distortion, and the upper top edge thereof has a reinforcing transverse frame bar 7 which may carry locking clips or retainers 8 and 9 at its opposite ends. A bottom transverse frame bar 10 may have opposite movable guide members 11 and 12 respectively, preferably hinged, as at 13, for enabling said guide members to be raised and lowered, and said members, as shown, are formed with bifurcated ends 14, which are adapted to project beyond the outer edge or side of the frame bar 10 when in lowermost position.

As indicated, two pivoted supporting frame bars 15 and 16 are attached toward the respective ends of the frame bar 10 and may be held in fixed upright position by set-screws 17, or otherwise, which, together with the bifurcated guide members 11 and 12 are adapted to support and maintain said frame arms 15 and 16 in fixed position, it being understood that the said upright arms are adapted to engage the spring clips or retainers 8 and 9 for securing and maintaining the upper cross frame bar 7 in fixed elevated position. Obviously, this frame construction may be modified considerably to meet particular requirements, and it is not intended to limit the construction to the exact form of locking guide members and retainers, as above set forth.

A handle 18 is shown secured to the lower cross frame 10, by means of a locking set-screw 19, or otherwise, and any suitable auxiliary supporting device, such as a wire handle, may be used to maintain the wind shield in the particular position desired.

When it is desired to use said portable wind shield, the flexible transparent frame 4 is opened up, the respective locking guide members 11 and 12 are moved into raised position for permitting the opposite side frame bars 15 and 16 to be raised from horizontal to vertical position, after which said locking guide members may be lowered for supporting said frame arms, and the set-screws 17 tightened, it being understood that the upper tongued ends of said side frame bars are brought into register and engagement with the spring clips or retainers 8 and 9 on the upper cross frame bar 7 for maintaining the flexible transparent protector frame 4 in fixed elevated position, and the handle 18 may be attached to the frame for enabling the user to retain the shield in desired position. When it is desired to collapse the device the opposite side frame bars 15 and 16 are disconnected from the clips or retainers 8 and 9 on the upper cross frame 7, then the lower supporting guide members 11 and 12 are raised, and when the set-screws 17 are loosened will permit of said side frame bars being lowered from vertical to horizontal position in alinement with the lower cross frame portion 10, and since the handle 18 preferably does not exceed in length the width of the frame, it is obvious that the entire device, when collapsed, may be deposited compactly within a protector frame or casing.

I claim:

1. In a portable wind shield, a knock-down frame comprising a body formed of transparent flexible material and having upper and lower side frames, the upper side frame having retainers, and the lower side frame having adjustable side frame bars adapted to engage the retainers in the upper side frame, and locking means for maintaining said side frame in vertical position, substantially as described.

2. In a portable wind shield, a knockdown frame comprising a body formed of transparent flexible material having upper and lower side frames, the upper side frame having end spring clips, and the lower side frame carrying opposite adjustable side frame bars adapted to engage the spring clips on the upper side frame for maintaining the frame in extended position, and locking means for the side frame bars, substantially as described.

3. In a portable wind shield, a knockdown frame comprising a body formed of transparent flexible material and having upper and lower side frames, the upper side frame having retainers, and the lower side frame carrying adjustable side frame bars at its opposite ends, and locking members secured to said lower frame for maintaining the side frame bars in vertical position, substantially as described.

4. In a portable wind shield, a knockdown frame comprising a body formed of transparent flexible material and having upper and lower side frames, the upper side frame having retainers, and the lower side frame carrying adjustable side frame bars at its opposite ends, adapted to be swung inwardly adjacent to the lower frame when collapsed, and when in vertical position adapted to engage the retainers in the upper side frame, and locking means secured to the lower side frame for maintaining the side frame bars in vertical position, substantially as described.

5. In a portable wind shield, a knockdown frame comprising a body formed of transparent flexible material and having upper and lower side frames, the upper side frame having retainers at its opposite ends, and the lower side frame carrying adjustable side frame bars having their upper ends adapted to engage the retainers in the upper side frame, and locking members secured upon and adjacent to the ends of the lower side frame, adapted when in lowermost position to retain the side frame bars in vertical position, and adapted when raised to permit said frame bars to be lowered, substantially as described.

6. In a portable wind shield, a knockdown frame comprising a body formed of transparent flexible material having upper and lower side frames, the upper side frame having retainers, and the lower side frame having adjustable side frame bars adapted to engage the retainers in the upper side frame, locking members for maintaining said side frame bars in vertical position, and a detachable handle secured to the lower side frame, substantially as described.

7. A collapsible wind shield comprising a flexible transparent shield member, two supporting frame members secured on opposite sides thereto, and a swingingly mounted arm on one of said members adapted to engage with the other of said members to maintain the same in extended position, substantially as described.

8. A collapsible wind shield comprising a flexible transparent shield member, two supporting frame members secured on opposite sides thereto, arms swingingly mounted on one of said members adapted to engage with the other of said members to maintain the same in extended position, and means for locking said arms in engaging position, substantially as described.

PETER J. BERNARD.

Witnesses:
WALKER BANNING,
EPHRAIM BANNING.

---

Copies of this patent may be obtained for five cents each, by addressing the "Commissioner of Patents, Washington, D. C."